April 16, 1957 C. D. SMITH 2,788,955
APPARATUS FOR CHANGING THE TEMPERATURE OF A ROOM
Filed Sept. 17, 1953 2 Sheets-Sheet 1
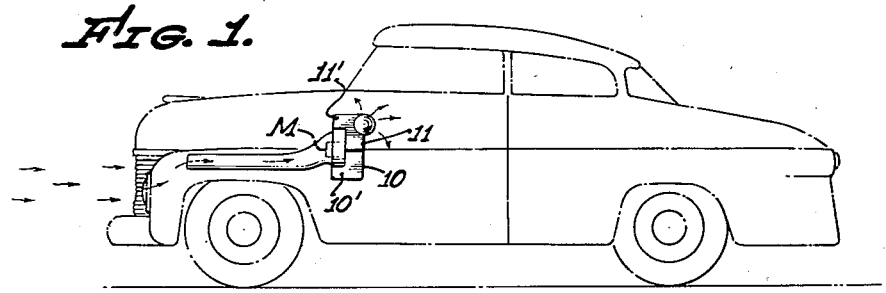
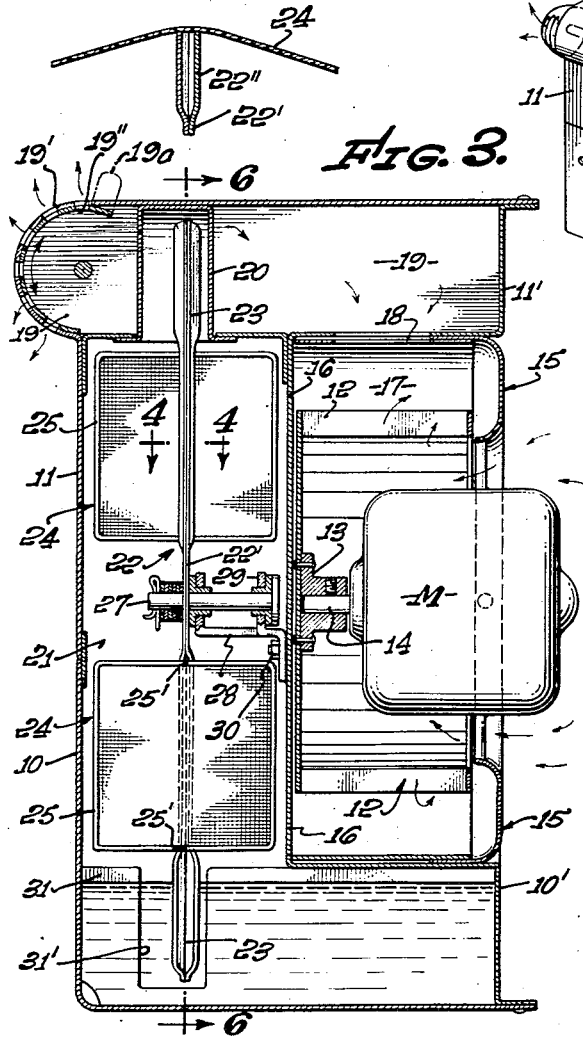
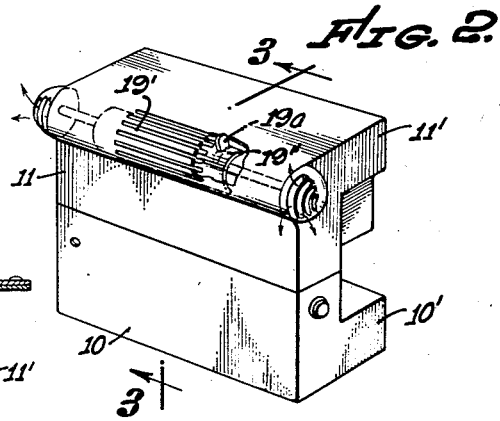
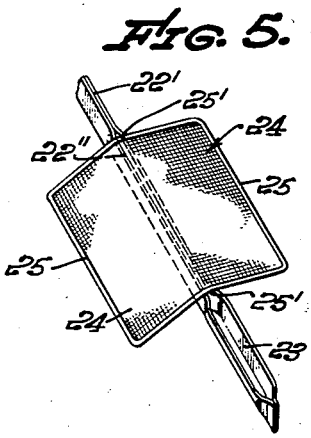
CLOYD D. SMITH,
INVENTOR.
BY
ATTORNEY.

April 16, 1957 C. D. SMITH 2,788,955
APPARATUS FOR CHANGING THE TEMPERATURE OF A ROOM
Filed Sept. 17, 1953 2 Sheets-Sheet 2
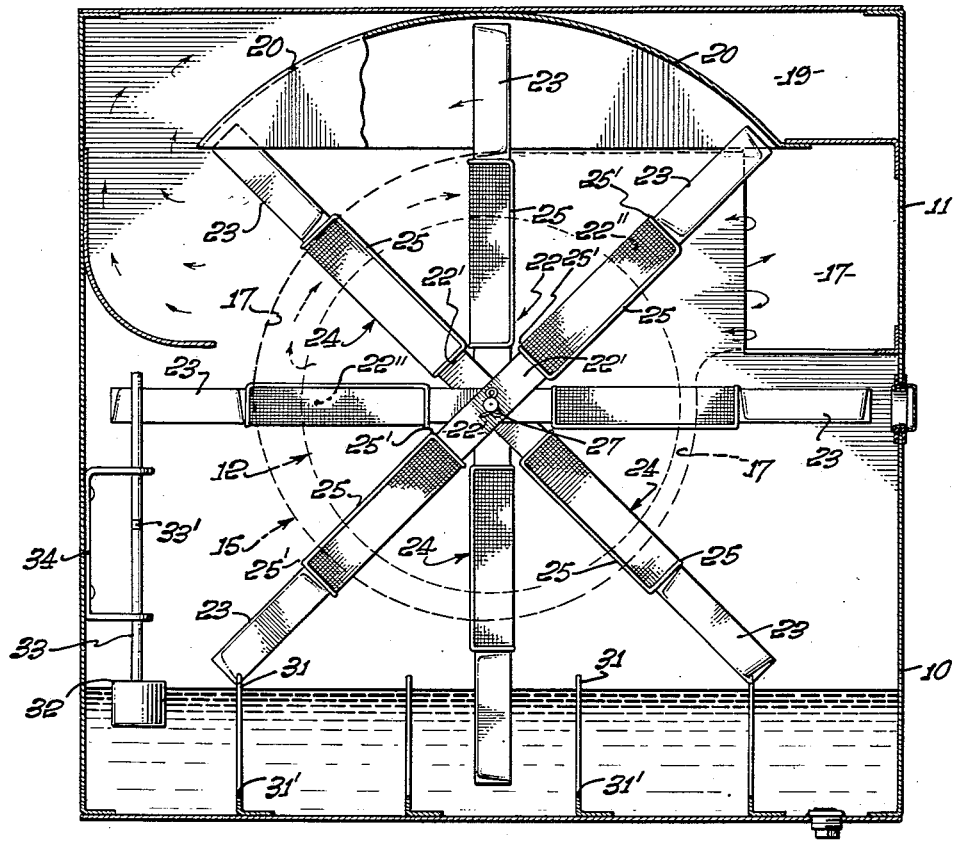
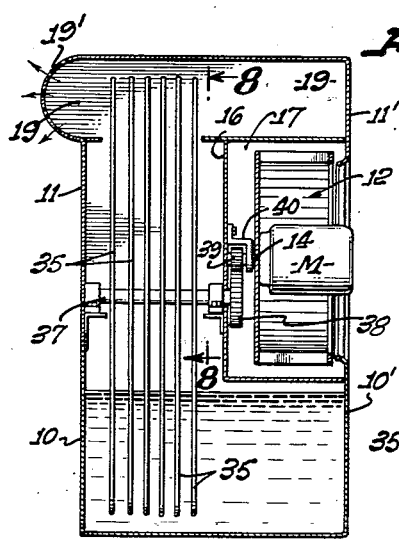
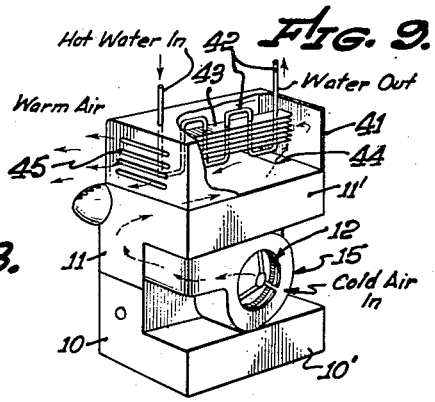
INVENTOR.
CLOYD D. SMITH,
BY
ATTORNEY

United States Patent Office 2,788,955
Patented Apr. 16, 1957

2,788,955
APPARATUS FOR CHANGING THE TEMPERATURE OF A ROOM

Cloyd D. Smith, Los Angeles, Calif.

Application September 17, 1953, Serial No. 380,676

2 Claims. (Cl. 261—30)

This invention relates to an apparatus for changing the temperature of a room, and more particularly to an apparatus which is designed for automobiles and the like, yet is easily adaptable to offices, living rooms and wherever it is desired to change the temperature condition from hot to cool, or from cold to warm, in a simple and economical manner.

Among the salient objects of the invention are:

To provide an apparatus of the character referred to which is compact, efficient and economical to operate and which has many uses, and from which there can be a wide distribution of cool air from the discharge member of the apparatus, or a more restricted discharge at the opposite ends of said discharge member;

To provide an apparatus in which a gauze covered vane or vanes or panels on a revolving member, are moved through a body of water for the purpose of picking up water sufficient to properly moisten said gauze covered panels, and through which the air is forced to be cooled before it is discharged into the area to be cooled;

To provide an apparatus designed to have applied thereto, as an attachment, a heating unit, whereby said apparatus can be converted into a heating apparatus, instead of a cooling apparatus;

To provide an apparatus in which, by reason of the arrangement for air circulation within the apparatus before it is discharged therefrom, a greater flow of treated air can be delivered from the apparatus.

Other objects and purposes of the invention will be apparent from the following more detailed description of one practical embodiment of the invention, taken in connection with the accompanying two sheets of drawings, which I will now describe. In the drawings:

Figure 1 shows a side elevation of an automobile for indicating how the cooling apparatus can be installed therein;

Figure 2 is a perspective view of the invention as here shown;

Figure 3 is an enlarged vertical sectional view of the invention, taken on line 3—3 on Fig. 2;

Figure 4 is a sectional view through a panel to be saturated, taken on line 4—4, Fig. 3;

Figure 5 is a perspective view of such a panel and its support;

Figure 6 is an enlarged vertical sectional view, taken on line 6—6 on Fig. 3;

Figure 7 is a sectional view through a modified form of the invention;

Figure 8 is a fragmentary view of one of the discs, as seen from line 8—8 on Fig. 7; and Figure 9 is a perspective view of the invention converted into a heater for furnishing warm air instead of cool air.

Referring now in detail to the drawings illustrating one embodiment of the invention, a body or housing for the apparatus is of special box form, as seen in Figs. 2 and 9, said body or housing, as here shown, having two angle or projecting portions, designated 10 and 11, put together one upon the other, with an upper rearward extension 11' and a lower rearward extension 10', as seen in Figs. 2 and 9.

Mounted in the rear of said housing, between the upper and lower extensions, is a blower 12, having supporting bearings as 13, on the power shaft 14 of a motor M, supported in an annular frame member 15, secured in the rearward opening, between said upper extension 11' and said lower extension 10', of said housing, as indicated in Fig. 3.

This frame member 15 forms an inlet opening for air drawn inwardly around the motor M, as indicated by the arrows. A wall 16 at the inner side of the blower 12, forms the air chamber 17 within which the blower 12 revolves, and into which air is drawn, as indicated. The top of said chamber has an opening, as at 18, communicating with a chamber 19, in the upper parts 11—11' of said housing, as seen in Fig. 3. In said chamber 19, is a narrow arched hood member, designated 20, and seen in transverse section in Fig. 3, and in longitudinal section in Fig. 6, for a purpose again referred to.

Rotatably mounted in the forward chamber, designated 21, Fig. 3, of the housing 10—11, is an air-moistener, designated as a whole 22, and consisting of a plurality of crossed arms, as seen in Fig. 6, each arm being formed, in the present showing, of a flat strip of metal, folded lengthwise upon itself, U-shape in cross section, and pressed together for a short distance in the middle, as at 22', to form a supporting bearing therefor, and left slightly open from the middle portion toward the end, as at 22'', and at its opposite ends, said arms formed into water-dipping cups, as 23, for dipping water to be carried upwardly and allowed to run down upon the gauze covered vanes or panels, designated 24, as indicated in Fig. 4. The square frame 25, with its gauze panel 24, is bent to an angle over the arm, adjacent the cup-like portion 23, as clearly shown in Fig. 5, at 25'. The crossed arms, in their middles 22', are secured together on a shaft 27, having its bearings in two supporting brackets 28 and 29, secured to the wall 16, as by means of bolts, as 30.

In the lower portion of the housing 10'—10, is a series of spaced baffle members, as 31, 31, Figs. 3 and 6, each having a cut-out portion, at 31', to give clearance for the cup-like portions 23, on each end of the crossed arms of the air-moistener.

A float element 32, on the lower end of a rod 33, is movably supported in a two-arm bracket 34, as seen in Fig. 6 to indicate the depth of the water in the reservoir or lower part of the housing. Said rod 33 has an indicating mark, as 33' thereon, between the arms of the bracket 34, for indicating water condition, as will be clear from the showing in Fig. 6.

In Fig. 7, I have shown a modified form of the invention, so far as the air-moistener is concerned, for in this form of the invention, I have shown a series of disc-like wire members, spaced axially, and designated 35, having gauze covered centers or panels 36, and mounted on a shaft 37, having its bearings in the opposite walls 11 and 16, as indicated, said shaft having a gear 38 on its inner end, in mesh with a pinion 39, on the shaft of the motor M, as indicated, with a supporting bracket 40, as shown.

As air is thus drawn into the housing by the fan or blower 12, around the motor M, as indicated by the little arrows, it is directed to and through the discharge 17 of the blower body, as indicated by arrows, the outline of the blower housing being indicated in light broken lines at 17, in Fig. 6. From this area or space 17, as indicated by the arrows, the air is directed into the air-moistening chamber 21, and in contact with the moistener members 22, and is then forced up into the space 19, as indicated by the arrows in the upper left corner of Fig. 6, around the hood member 20, provided to give protection for the revolving members 23, 23, and seen in section in Fig. 3.

From this upper area 19, the cooled air is directed to and out through the discharge member, designated 19' in Fig. 2, and in Fig. 3, and having a damper member 19" with an operating finger 19a, for moving said damper to close or open the outlet openings in the discharge member 19", as may be desired. When said openings are closed, the air in smaller quantity can be discharged through the ends of said discharge member, as indicated.

In Fig. 7, this outlet member is also designated 19' without any damper element. This form of the invention is more to show the spaced disc-like members 35 for moistening the air passing therethrough.

In Fig. 9, I have shown how the apparatus here illustrated, can be converted into a heating apparatus for heating air instead of cooling it. In this showing, I have provided a heating unit or case 41, mounted on top of the body 11, with hot water pipe and loops 42, supported therein, and extending through spaced fins or strips of metal 43, for heating purposes. The water pipe is to be connected with the radiator of an automobile, whereby the hot water from the engine can circulate therethrough for heating the air passing through this case 41, as will be understood from the drawing in Fig. 9. An opening 44 in the bottom of said case 41 is shown for the admission of air thereto, which passes around the pipes and said fins 43, and out through the outlet slots 45 in the end of said casing, into the car, or room to be warmed.

Thus I have provided an improved air conditioner of novel construction and arrangement which includes a case or housing having one side open and formed into a blower case, with a blower therein and with the motor in the blower, all in axial alinement, and with an air-moistening chamber in said housing, above a water chamber, and with an air circulating course from said blower around through the air-moistener chamber and to the discharge for cool air; a structure which is compact, economical and can be adapted for automobiles or other vehicles, and also for living rooms.

I do not limit the invention to these details of construction and arrangement shown for explanatory purposes, except as I may be limited by the hereto appended claims, forming a part of this application.

I claim:

1. An air conditioner apparatus, comprising: a housing providing a blower case having an open rearward side, said housing having a water chamber in the bottom thereof, a discharge member having an opening in the forward side and an air passage extending from said blower case, through said water chamber and to said discharge opening: and a rotary air-moistening means including a plurality of gauze-covered frame means each saturable with water contained in said water chamber, air passing through said water chamber to said discharge opening flowing radially of said rotary frame means to absorb moisture from the saturated gauze thereof, said rotary air-moistening means including a shaft, a plurality of radial arms rotatable on the axis of said shaft, each arm having an elongate scoop portion at its outer end for dipping into water contained in said water chamber, said gauze-covered frame means being carried by said arms intermediate the shaft and said scoops, water picked up by each scoop flowing from the scoop downwardly onto the gauze of said frame means when each scoop reaches the uppermost part of its rotary movement.

2. An air conditioner apparatus, comprising: a housing providing a blower case having an open rearward side, said housing having a water chamber in the bottom thereof, a discharge member having an opening in the forward side and an air passage extending from said blower case, through said water chamber and to said discharge opening: and a rotary air-moistening means including a plurality of gauze-covered frame means each saturable with water contained in said water chamber, air passing through said water chamber to said discharge opening flowing radially of said rotary frame means to absorb moisture from the saturated gauze thereof, said rotary air-moistening means including a shaft, a plurality of radial arms rotatable on the axis of said shaft, each arm having an elongate scoop portion at its outer end for dipping into water contained in said water chamber, said gauze-covered frame means being carried by said arms intermediate the shaft and said scoops, said radial arms having longitudinal open portions adjacent to the gauze-covered frames and communicating between said scoops and said gauze, water picked up by each scoop flowing from the scoop downwardly through said open portion and onto the gauze of said frame means when each scoop reaches the uppermost part of its rotary movement.

References Cited in the file of this patent

UNITED STATES PATENTS

| Number | Name | Date |
|---|---|---|
| 1,989,787 | Byrd | Feb. 5, 1935 |
| 2,013,270 | Grady | Sept. 3, 1935 |
| 2,036,929 | Durnell et al. | Apr. 7, 1936 |
| 2,132,288 | Van De Vanter | Oct. 4, 1938 |
| 2,170,576 | Shaver | Aug. 22, 1939 |
| 2,210,354 | Bates | Aug. 6, 1940 |
| 2,228,550 | Young | Jan. 14, 1941 |
| 2,237,497 | Munford | Apr. 8, 1941 |
| 2,343,820 | Thornton | Mar. 7, 1944 |
| 2,431,146 | Steele | Nov. 18, 1947 |
| 2,551,227 | Yost | May 1, 1951 |
| 2,634,669 | Greenmun | Apr. 14, 1953 |
| 2,661,894 | Stevenson et al. | Dec. 8, 1953 |
| 2,686,630 | Burrowes | Aug. 17, 1954 |